US008419662B2

(12) United States Patent
Hobson et al.

(10) Patent No.: US 8,419,662 B2
(45) Date of Patent: Apr. 16, 2013

(54) HAND HELD MASSAGING TOOL (75) Inventors: Barry Reginald Hobson, North Lake (AU); Angelo Paoliello, Sawyer Valley (AU)

(73) Assignee: Merlex Corporation Pty Ltd, Bentley (AU)

( * ) Notice: Subject to any disclaimer, the term of this patent is extended or adjusted under 35 U.S.C. 154(b) by 1176 days.

(21) Appl. No.: 12/096,298

(22) PCT Filed: Dec. 6, 2006

(86) PCT No.: PCT/AU2006/001856
§ 371 (c)(1),
(2), (4) Date: Nov. 10, 2008

(87) PCT Pub. No.: WO2007/065217
PCT Pub. Date: Jun. 14, 2007

(65) Prior Publication Data
US 2009/0221944 A1    Sep. 3, 2009

Related U.S. Application Data (60) Provisional application No. 60/597,522, filed on Dec. 7, 2005.

(51) Int. Cl.
*A61H 1/00* (2006.01)
*A61H 7/00* (2006.01)
*A61H 19/00* (2006.01)

(52) U.S. Cl.
USPC .................. 601/84; 601/78; 601/80; 601/85; 601/87

(58) Field of Classification Search ............... 601/78–81, 601/84, 85, 87, 89, 93; 15/22.1, 28, 97.1
See application file for complete search history.

(56) References Cited

U.S. PATENT DOCUMENTS 2,949,108 A * 8/1960 Vecchio ........................... 601/18
3,765,407 A * 10/1973 Prince .............................. 601/90
(Continued)

FOREIGN PATENT DOCUMENTS

DE    20220014    3/2003
JP    1085290     4/1998
(Continued)

OTHER PUBLICATIONS

A. Leduc, P. Lievens, J. Dewald, The influence of multidirectional vibrations on wound healing and on regeneration of blood-and lymph vessels, Lymphology. Dec. 1981; 14(4):pp. 179-185, PMID: 7334835 [PubMed—indexed for MEDLINE], USA.

(Continued)

Primary Examiner — Justine Yu
Assistant Examiner — Raymond G Chen
(74) Attorney, Agent, or Firm — McGarry Bair PC (57) ABSTRACT A hand held tool 10 has a handle 14, a contact member 16, and an electric motor 12. The contact member has a contact surface portion 17 lying in a first plane. The motor 12 has a stator 23 and an armature 19. The armature 19 is able to move with non-rotary translational motion relative to the stator 23 in a second plane which is parallel to the first plane. One of the stator 23 and the armature 19 is attached to the handle 14, while the other is attached to the contact member 16. Relative motion of the stator 23 and armature 19 imparts relative motion between the handle 14 and the contact member 16. A resilient coupling 18 is coupled between the handle 14 and the contact member 16 and applies a bias against the relative motion between the handle 14 and contact member 16.

11 Claims, 10 Drawing Sheets

U.S. PATENT DOCUMENTS

| | | | | |
|---|---|---|---|---|
| 3,841,321 | A | 10/1974 | Albach et al. | |
| 3,916,921 | A * | 11/1975 | Pesola | 132/73.6 |
| 3,935,869 | A | 2/1976 | Reinsch | |
| 4,098,266 | A | 7/1978 | Muchisky et al. | |
| 4,102,334 | A | 7/1978 | Muchisky | |
| 4,116,233 | A | 9/1978 | Scaduto | |
| 4,150,668 | A | 4/1979 | Johnston | |
| 4,224,932 | A | 9/1980 | Farb | |
| 4,401,109 | A | 8/1983 | DeJong | |
| 4,481,939 | A | 11/1984 | Mabuchi | |
| 4,535,760 | A | 8/1985 | Ikeda et al. | |
| 4,599,997 | A | 7/1986 | Bucher | |
| 4,604,993 | A | 8/1986 | Moriwaki et al. | |
| 4,684,124 | A * | 8/1987 | Escher | 482/110 |
| 4,686,797 | A * | 8/1987 | Hoffman | 451/356 |
| 4,691,693 | A | 9/1987 | Sato | |
| 4,711,229 | A | 12/1987 | Hengl | |
| 4,729,368 | A | 3/1988 | Guitay | |
| 4,753,226 | A | 6/1988 | Zheng et al. | |
| 4,757,806 | A | 7/1988 | Muchisky et al. | |
| 4,764,695 | A * | 8/1988 | Inoue et al. | 310/20 |
| 4,846,158 | A | 7/1989 | Teranishi | |
| 4,911,149 | A | 3/1990 | Borodulin et al. | |
| 5,063,911 | A | 11/1991 | Teranishi | |
| 5,176,130 | A | 1/1993 | Kim | |
| 5,305,738 | A | 4/1994 | Shimizu | |
| 5,327,886 | A | 7/1994 | Chiu | |
| 5,356,369 | A | 10/1994 | Yamasaki et al. | |
| 5,383,842 | A | 1/1995 | Bertini | |
| 5,413,551 | A | 5/1995 | Wu | |
| 5,415,621 | A | 5/1995 | Campbell | |
| 5,551,949 | A | 9/1996 | Kim | |
| 5,575,761 | A | 11/1996 | Hajianpour | |
| 5,656,018 | A | 8/1997 | Tseng | |
| 5,716,332 | A | 2/1998 | Noble | |
| 5,782,857 | A | 7/1998 | Machuron | |
| 5,793,133 | A * | 8/1998 | Shiraki et al. | 310/81 |
| 5,857,985 | A | 1/1999 | Feng | |
| 5,925,002 | A | 7/1999 | Wollman | |
| 5,935,089 | A | 8/1999 | Shimizu | |
| 5,997,489 | A | 12/1999 | Iwamoto et al. | |
| 6,083,181 | A | 7/2000 | Marcantoni | |
| 6,086,550 | A | 7/2000 | Richardson | |
| 6,160,328 | A * | 12/2000 | Hobson et al. | 310/20 |
| 6,251,089 | B1 | 6/2001 | Kuznets et al. | |
| 6,355,007 | B1 | 3/2002 | Zuckerbrod | |
| 6,436,062 | B1 | 8/2002 | Iwamoto et al. | |
| 6,440,092 | B1 | 8/2002 | Leventhal et al. | |
| 6,478,755 | B2 | 11/2002 | Young | |
| 6,517,499 | B1 | 2/2003 | Pereira | |
| 6,551,337 | B1 | 4/2003 | Rabiner et al. | |
| 6,579,251 | B1 | 6/2003 | Randoll | |
| 6,730,050 | B2 * | 5/2004 | Huang | 601/93 |
| 6,824,546 | B1 | 11/2004 | Yiu | |
| 6,879,067 | B1 * | 4/2005 | Rockwell | 310/36 |
| 2002/0058892 | A1 | 5/2002 | Young | |
| 2004/0068213 | A1 | 4/2004 | Fujisawa | |
| 2004/0077978 | A1 | 4/2004 | Nelson et al. | |
| 2004/0102725 | A1 | 5/2004 | Wang et al. | |
| 2004/0222708 | A1 * | 11/2004 | Hobson et al. | 310/36 |

FOREIGN PATENT DOCUMENTS

| | | |
|---|---|---|
| JP | 10085290 | 4/1998 |
| JP | 3044083 | 5/2000 |
| JP | 2004202464 | 7/2002 |
| WO | 2004103179 | 2/2004 |
| WO | WO 2004103179 A1 * | 12/2004 |

OTHER PUBLICATIONS

Thomas C.M. Lundeberg, Vibratory Stimulation for the Alleviation of Chronic Pain; Acta Physiologica Scandinavica Supplementum 523, From the Department of Physiology II, Karolinska Institutet, 1983, 523:1-51; Stockholm, Sweden.

T. Lundeberg, Long-Term Results of Vibratory Stimulation as a Pain Relieving Measure for Chronic Pain, Department of Physiology II, Karolinska Institutet, Feb. 27, 1984, Pain, 20 (1984) pp. 13-23; Stockholm, Sweden; Elsevier Science Publishers B.V.

Declan A.J. Connolly, Stephen P. Sayers, and Malachy P. McHugh, Treatment and Prevention of Delayed Onset Muscle Soreness, Journal of Strength and Conditioning Research, 2003, 17(1), 197-208; 2003 National Strength and Conditioning Association; USA.

Julian M. Stewart, Carol Karman, Leslie D. Montgomery and Kenneth J. McLeod, Plantar vibration improves leg fluid flow in perimenopausal women, Am J Physiol Regul Integr Comp Physiol 288:623-629, 2005. First published Oct. 7, 2004; doi:10.1152/ajpregu.00513.2004; USA.

* cited by examiner

HAND HELD MASSAGING TOOL

CROSS-REFERENCE TO RELATED APPLICATIONS

This application is a national phase of International Application No. PCT/AU2006/001856, filed Dec. 6, 2006, and claims priority from U.S. Application Ser. No. 60/597,522 filed Dec. 7, 2005.

FIELD OF THE INVENTION

The present invention relates to a hand held tool, and more particularly to a hand held massage tool or like device for personal use on the body, such as a face cleanser, skin rejuvenator, cellulite treatment, subcutaneous and epifascial tissue manipulation, muscle rejuvenation, body fluid circulatory aid, pain management etc.

BACKGROUND OF THE INVENTION

Hand held electrically driven massagers have been available in many different forms for a long period of time. Generally, such massagers rely on percussion or impact in order to generate vibrations that are applied to the body. This is achieved using an electric motor having a stator and a rotor where the rotor rotates about a central axis. The rotor in turn rotates an eccentrically weighted disc or eccentrically disposed weights to generate vibration or operates through an offset crank arrangement to provide the stimulation.

Some forms of the prior art massagers have controls to vary the motor speed which provides variation in vibration through the centrifugal effects in counterweight versions but do not have the capacity to dynamically change the amplitude or intensity of stimulation at a predetermined frequency.

SUMMARY OF THE INVENTION

According to the present invention there is provided a hand held tool comprising:
a handle;
a contact member having a contact surface portion lying in a first plane;
an electric motor having a stator and an armature, the armature being moveable with non-rotary translational motion in a second plane relative to the stator, wherein the handle is attached to one of the stator and the armature, and the contact member is attached to another of the stator and the armature, and wherein the first plane is parallel to the second plane, whereby the relative motion between the armature and the stator produces corresponding motion of the contact member relative to the handle; and,
a resilient coupling coupled between the handle and the contact member and applying a bias against the motion of the contact member relative to the handle.

The armature may comprise a carrier or plate formed separately of the contact member and attached to or otherwise coupled with the contact member. Although in an alternate embodiment the carrier may be formed as a part of the contact member. The armature further comprises a plurality of current carrying coils which may be attached to one or both faces of the carrier. However, in an alternative form, the carrier may be formed with a plurality of holes in which the coils are disposed. In this event, the carrier and the coils can be formed of a substantially equal thickness so that the coils lie substantially flush with the carrier. In an alternative embodiment the carrier may comprise a plurality of seats for supporting coils formed integrally with the contact member or formed integrally with a portion of the contact member.

In one embodiment the resilient coupling comprises one or more resilient members interposed between the magnet and the carrier. The resilient members may be in the form of resilient posts. The posts may be seated at opposite ends in holes or recesses formed in the magnet and the carrier. More particularly, each resilient member may be in the form of a post having a reduced diameter portion at opposite ends, the reduced diameter portions being received in respective holes formed in the magnet and the carrier.

In an alternative embodiment, the resilient coupling comprises one or more resilient members connected between the handle and the contact member. In a more specific form of this embodiment, the resilient coupling may comprise an endless band connecting the handle to the contact member. The band may form a liquid tight seal between the handle and the contact member.

The stator comprises a magnet arranged to produce lines of magnetic flux that pass through the armature via an air gap in a direction perpendicular to the second plane. In the same or an alternative embodiment the stator comprises a magnet arranged to produce lines of magnetic flux that circulate in a closed path having opposite lengths, each of which extend in a direction perpendicular to the second plane.

In one embodiment the magnet comprises a set of poles, one on each side of the coils. Each set of poles may comprise a single pole piece. In such an embodiment each pole piece may be in the general shape of a ring or annulus having an outer radial portion and an inner radial portion wherein the inner and outer radial portions are of an opposite magnetic pole, and wherein the pole pieces on opposite sides of the carrier are arranged so that axially aligned poles are of opposite polarity.

In an alternative embodiment, each set of poles may comprise a plurality of individual pole pieces. In this embodiment the pole pieces may be arranged in side by side pairs of opposite pole. Moreover, the pole pieces may be in the form of elongated bar magnets in which magnetic flux travels in a direction perpendicular to the lengthwise direction of the bar magnets. In this embodiment the stator further comprises, for all of the poles on each side of the armature, a respective backing plate, the or each backing plate being made of a magnetically permeable material wherein the poles of each side of the armature are magnetically attached or adhered to the respective backing plate.

Each coil may comprise a single winding having one or more turns. However, in an alternative embodiment each coil may comprise two planar windings stacked on top of each other. In this embodiment each winding has an inner end and an outer end, with adjacent windings in a stack wound in opposite direction and the inner ends of the windings connected together, the outer ends of the windings providing connection points for current to flow into and out of the coil. By virtue of this arrangement, current circulates in the same direction (i.e. clockwise or anti-clockwise) in each winding of a particular coil.

When the pole pieces are in the form of annular pole pieces, the coils are in the shape of sectors of an annulus, having inner and outer curved branches in axial alignment with the inner and outer radial portions of the annular pole pieces.

However, when the magnet comprises a plurality of elongate pole pieces, the coil comprises a pair of parallel straight branches in axial alignment with respective pole pieces in the side by side pairs.

The tool comprises a housing constituted at least in part by the handle and the contact member, wherein the motor is disposed inside the housing. The contact member may comprise an outer substantially planar surface that lies in a plane parallel to the force plane. In one particular embodiment, the housing may be formed with an axial through hole. In such an embodiment the tool may further comprise an inflatable member disposed in the axial hole.

The tool may comprise a plurality of spacers that space the sets of poles a fixed distance on either side of the coils.

The tool further comprises driver circuits providing electric currents to the coils and control circuits that control the driver circuits. The driver circuits may be provided on a circuit board located between the handle and the contact member. The control circuit may be on the same board as the driver circuits or alternatively located remotely of the tool. In the latter event, communication between the control circuit and the driver circuit may be via a wire, or in a wireless manner. Additionally, power may be provided to the tool either by an on board power source such as batteries from a remote source supplied by wire.

BRIEF DESCRIPTION OF THE DRAWINGS

Embodiments of the present invention will now be described by way of example only with reference to the accompanying drawings in which.

DETAILED DESCRIPTION OF PREFERRED EMBODIMENTS

With reference to the accompanying drawings and in particular FIGS. 1 to 4, an embodiment of the hand held tool 10 comprises an electric motor 12, a handle 14, a contact member 16, and a resilient coupling 18 coupled between the handle 14 and the contact member 16.

Figure 3:
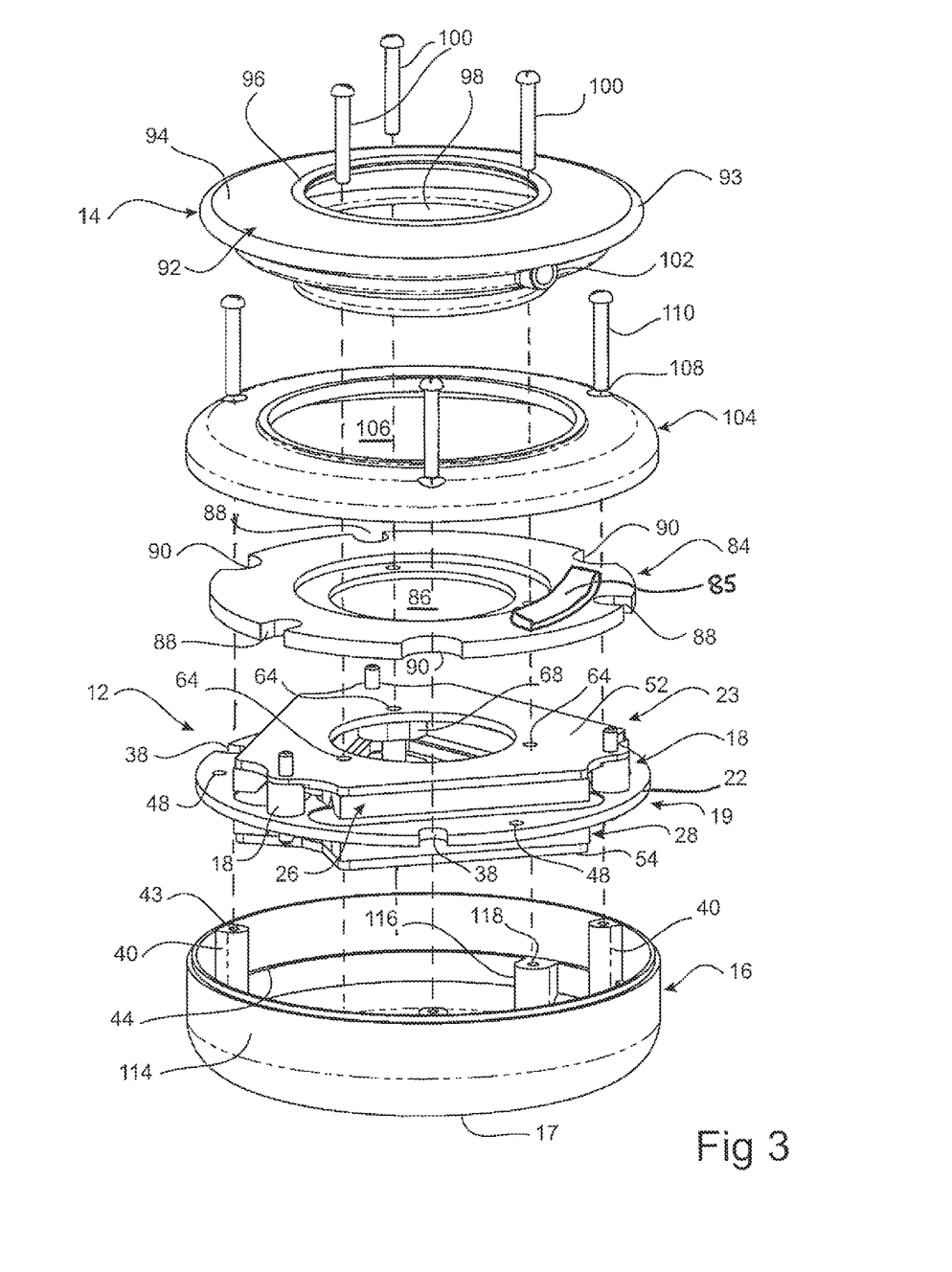
FIG. 3 is a partial exposed view of the tool shown in FIGS. 1-2.
Figure 4:
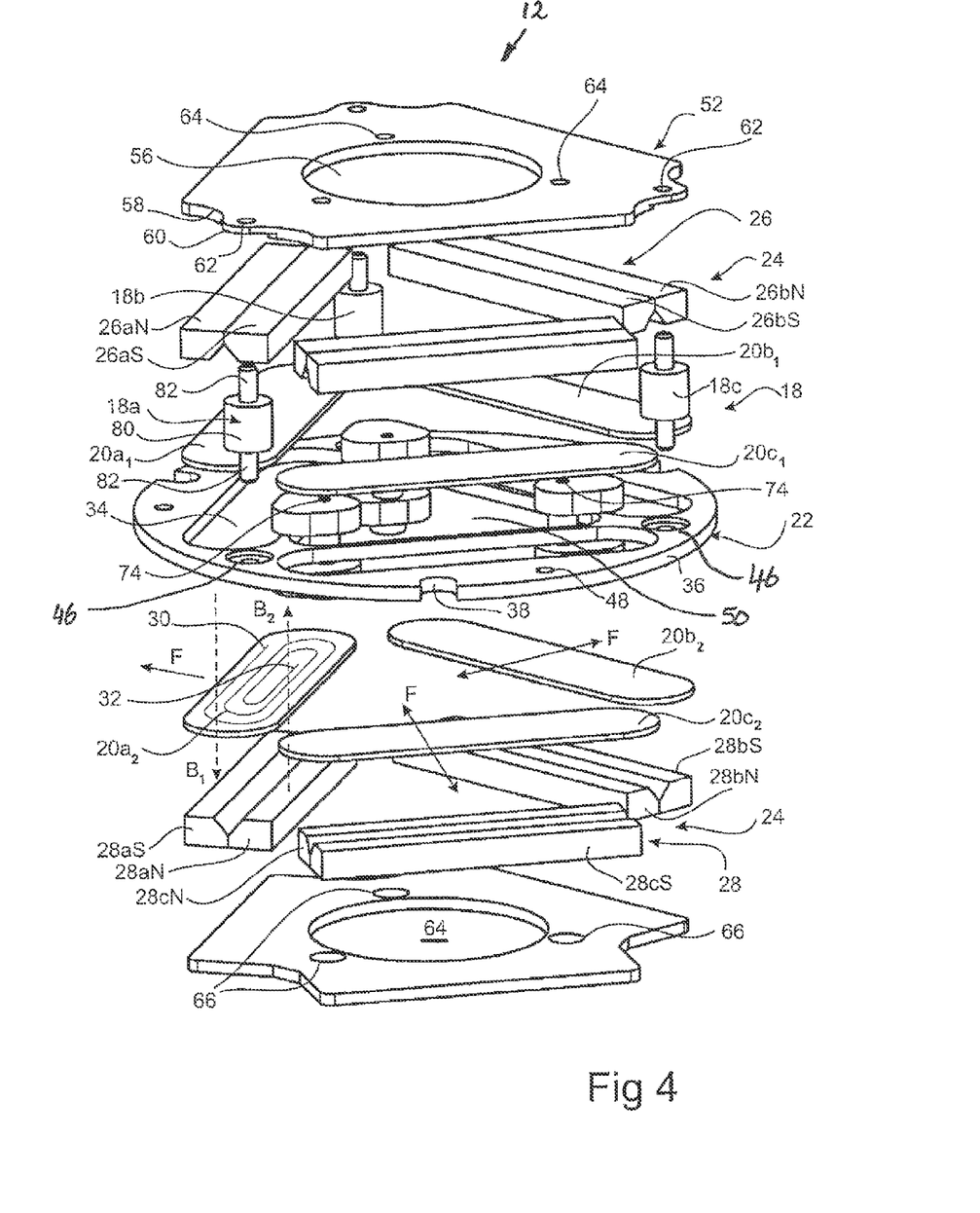
FIG. 4 is an exploded view of a motor incorporated in the tool shown in FIGS. 1-3.

The contact member 16 has a contact surface portion 17 that lies in a first plane. With particular reference to FIGS. 3 and 4, the electric motor 12 comprises an armature 19, having a plurality of electric current carrying coils $20a1$, $20a2$, $20b1$, $20b2$, $20c1$ and $20c2$ (hereinafter referred to in general as "coils 20") supported by a carrier 22, and a stator 23 which comprises a magnet 24 producing lines of magnetic flux travelling in a direction substantially perpendicular to a direction of current flowing through the coils 20 so as to produce a plurality of transverse linear (i.e. translational) forces F. Each coil is composed of two windings: coil $20a$ comprising windings $20a_1$ and $20a_2$, coil $20b$ comprising windings $20b_1$ and $20b_2$ and coil $20c$ comprising windings $20c_1$ and $20c_2$. As will be explained in greater detail below, the stator 23, and thus the magnet 24, is attached to the handle 14 while the armature 19, and thus the coils 20, are attached to the contact member 16. However, in an alternative embodiment, this configuration can be reversed so that the armature 19 is attached to the handle 14 and the stator 23 is attached to the contact member 16.

The resilient coupling 18 in this particular embodiment comprises three separate resilient members 18A, 18B and 18C. The resilient coupling 18 acts between the handle 14 and contact member 16 to enable relative planar motion therebetween. This is manifested by the coupling 18 applying a bias against the motion between the contact member 16 and the handle 14. The bias acts to return the contact member 16 and handle 14 to a mutually aligned position in response to the motion generated by the application of the translation forces F which act to move the contact member 16 relative to the handle 14.

As explained in greater detail below, the armature 19 is moveable with non-rotary translational motion in a second plane relative to the stator 23. The second plane is parallel to the first plane containing the contact surface portion 17. Thus, relative motion between the armature 19 and stator 23 produces corresponding motion of the contact member 16 relative to the handle 14.

A detailed explanation of the operation of the electric motor 12 is contained in U.S. Pat. No. 6,160,328, the contents of which are incorporated herein by way of reference. Nevertheless, a brief overview of the structure and function of the motor 12 is set out below.

The magnet 24 of the motor 12 is formed, in this embodiment, as sets of poles 26 and 28 on opposite sides of the coils 20. The set of poles 26 comprise three pairs of $26_{an}$, $26_{as}$; $26_{bn}$, $26_{bs}$; and $26_{cn}$ and $26_{cs}$. The set of poles 28 comprises pairs of pole pieces $28_{as}$, $28_{an}$; $28_{bs}$, $28_{bn}$; $28_{cs}$ and $28_{cn}$. The pole pieces in the sets 26 and 28 are axially aligned with each other, with axially aligned pole pieces being of opposite polarity. For example, pole piece $26_{an}$, a magnetic north pole, is axially aligned with magnetic south pole piece $28_{as}$, while the magnetic south pole piece $26_{as}$ is axially aligned with magnetic north pole piece $28_{an}$. As a consequence, the magnetic field generated between these pole pieces contains lines of flux B1 extending in a downward direction and lines of magnetic flux B2 extending in an upward direction.

The windings $20a_1$ and $20a_2$ are disposed so that the lines of magnetic flux B1 and B2 extend through longitudinal segments of the windings $20a_1$ and $20a_2$. In FIG. 4 the winding $20a_2$ is shown as having a current circulating in a clockwise direction. The interaction between the current flowing to the winding $20a_2$ and the lines of magnetic flux B1 and B2 produce the translational force F. This force F acts on the armature 19/carrier 22 and, as explained in greater detail below, acts between the contact member 16 and handle 14. By a similar process, each group of pole pieces and coils produce corresponding forces F. These forces act in a plane containing the carrier 22.

By supplying the motor 12 with a three-phase current where different phases are delivered to each of coils $20a$, $20b$ and $20c$, an orbital motion in a plane can be produced by the forces F. It is noted that this is an orbital motion, not a rotary motion. Further, by appropriate phasing and control of current magnitude, the planar motion generated by the forces F can follow any path that can be resolved into two orthogonal vectors in the plane. Thus, the motor 12 can generate planar motion following, for example, a FIG. 8, clover leaf or star-shaped path.

Each winding has an outer end 30 and an inner end 32. The windings of each coil are turned in opposite directions with the inner ends 32 connected together. The outer ends 30 of each winding provide connection points for current flowing into and out of a particular coil. By this arrangement, current circulates in the same direction (i.e. clockwise or anti-clockwise) in each of the windings of any particular coil.

The carrier 22 comprises a plate that is formed separately of the contact member 16 and attached or otherwise coupled to the contact member 16. The carrier 22 comprises a plurality of apertures 34, one for each of the coils 20; that is, both of the windings of each coil are seated within respective apertures 34. The coils 20 are made of a thickness substantially equal to the thickness of the carrier plate 22 so that the coils lie substantially flush with the carrier 22.

An outer peripheral edge 36 of the carrier 22 is formed with three equally spaced-apart U-shaped cutouts 38. The cutouts 38 receive respective upright posts 40 formed integrally about an inner circumferential surface 42 of the contact member 16. This keys the carrier 22 to the contact member 16. A threaded hole 43 is formed in each post 40. A circumferential ledge 44 is also formed about the inner circumferential surface 42 for seating the carrier 22.

The carrier 22 further comprises three evenly spaced counter-sunk holes 46 formed between adjacent apertures 34. A further set of three through holes 48 is formed in the carrier 22, the holes 48 being evenly spaced from each other, but offset from the counter sunk holes 46. Finally, a central aperture 50 is formed in the carrier 22 inboard of the apertures 34.

The pole set 26 is magnetically coupled to first backing plate 52, while the pole set 28 is magnetically coupled to a second backing plate 54, as shown in FIG. 4.

The backing plate 52 is in a general shape of a triangle, having a central circular aperture 56 and with each apex of the triangle removed. In place of the removed apex is a wave-shaped edge 58 having a central crest 60 formed with a hole 62 countersunk on an underside of the plate 52. A further set of three spaced-apart holes 64 is formed through the backing plate 52 in board of and in radial alignment with the countersunk holes 60. The plate 52 forms one leg of a return path for magnetic flux generated by the magnet 24.

The backing plate 54 forms a second leg of the return path for magnetic flux created by the magnet 24, and is also in the general shape of a triangle, but with each apex removed and with a central aperture 64 that is of the same diameter as, and in axial alignment with, the aperture 56. The plate 54 also includes a set of three equally spaced holes 66.

The combination of the backing plates 52 and 54 and the pole sets 26 and 28 form the stator 23.

A plurality of spacers 68 space the pole sets 26 and 28 a minimum distance from opposite sides of the coils 20.

Figure 5A:
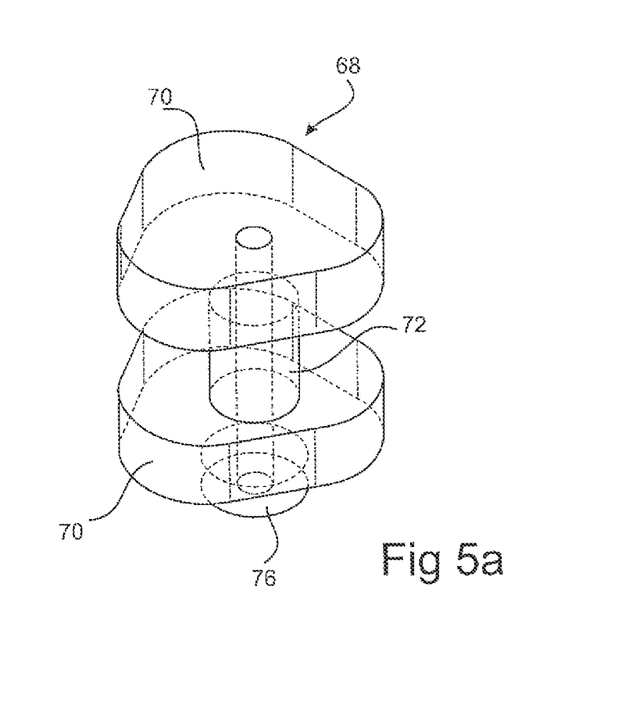
FIG. 5A is a perspective view of a spacer incorporated in the tool.
Figure 5B:
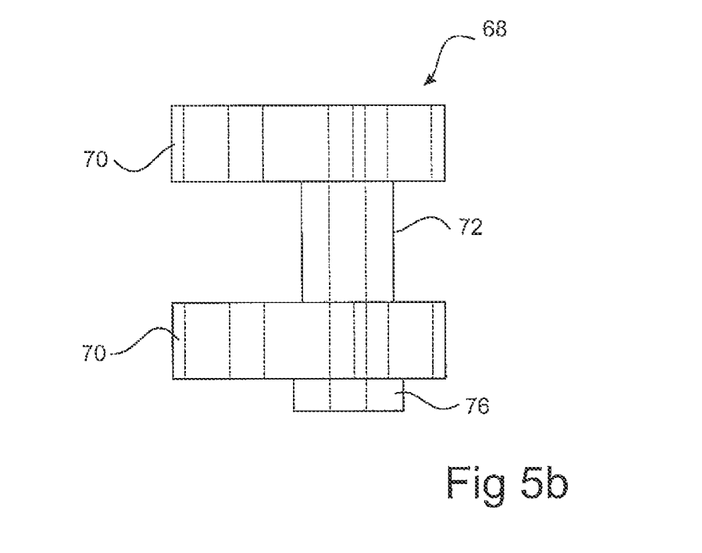
FIG. 5B is a side view of the spacer shown in FIG. 5A.

With particular reference to FIGS. 5A and 5B, each spacer 68 comprises a pair of lands 70 that are spaced by an integrally formed column 72. Each of the lands 70 is of a generally triangular shape, but with each apex rounded. A topped hole 74 is formed in one of the lands 70 and extends through the column 72. A boss 76 extends from the other land 70 from a side opposite to, and in alignment with, the column 72.

In the assembled motor 12, the spacers 68 pass through the central hole 50 in the armature 19/carrier 22 and are each located adjacent a respective corner of the aperture 50. The lands 70 on each spacer 68 abut the first and second backing plates 52 and 54 and are seated between adjacent pairs of pole pieces in the pole sets 26, 28. The boss 76 is received within respective holes 66 in the second backing plate 54, and the holes 74 are aligned with respective holes 64 formed in the first backing plate 52.

Each of the resilient members 18a, 18b, 18c comprise a cylindrical rubber column 80 molded onto two separate axially extending threaded studs 82. One end of each of the rubber columns 80 is seated in respective countersunk hole 46 with the adjacent stud 82 passing through the carrier 22. An opposite end of each rubber column 80 is seated in a respective countersunk hole 62 in the backing plate 52 with an adjacent stud 82 passing through the plate 52. Respective nuts (not shown) are screwed onto portions of the studs 82 extending through the holes 46 and 62 to attach the backing plate 52 to the carrier 22. Magnetic attraction holds the backing plate 54 and attached pole set 28 on an opposite side of the carrier 22.

By virtue of this arrangement, the armature 19/carrier 22 is able to move in a plane relative to the stator 23/magnet 24.

Referring to FIGS. 3 and 4, the tool 10 also comprises a circuit board 84 that carries electronic circuits 85 for the operation of the tool 10. The circuit board is in the general form of a disc having a central aperture 86 with a first set of three equally spaced-apart U-shaped cutouts 88, and a set of three equally spaced-apart C-shaped cutouts 90 formed about its outer circumferential edge. The U-shaped cutouts 88 receive the posts 40. The C-shaped cutouts 90 provide spaces for connecting wires to pass from circuits (not shown) mounted on the circuit board 84 to the coils on the carrier 22.

Figure 1:
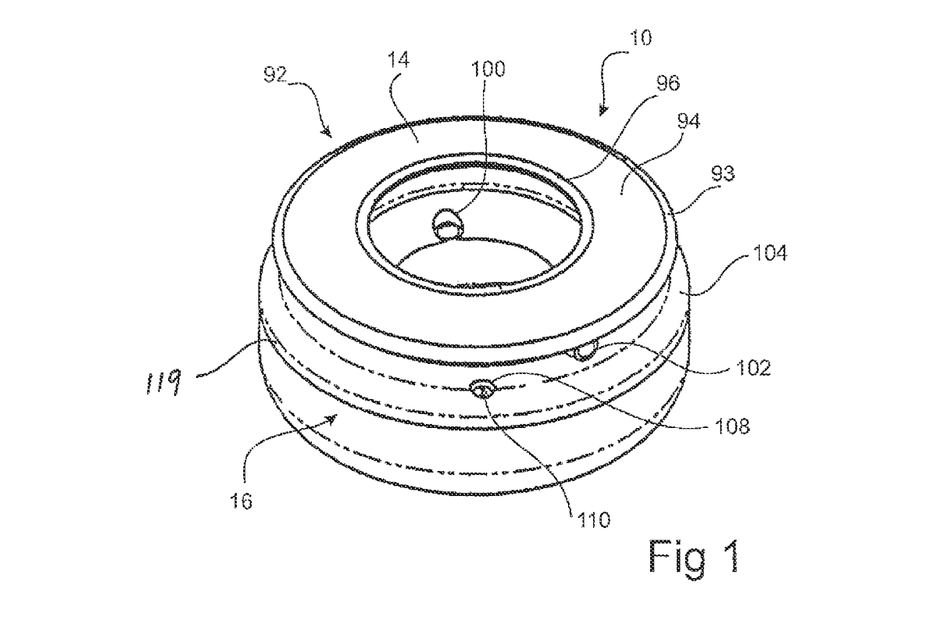
FIG. 1 is a perspective view of a first embodiment of the hand held tool.
Figure 2:
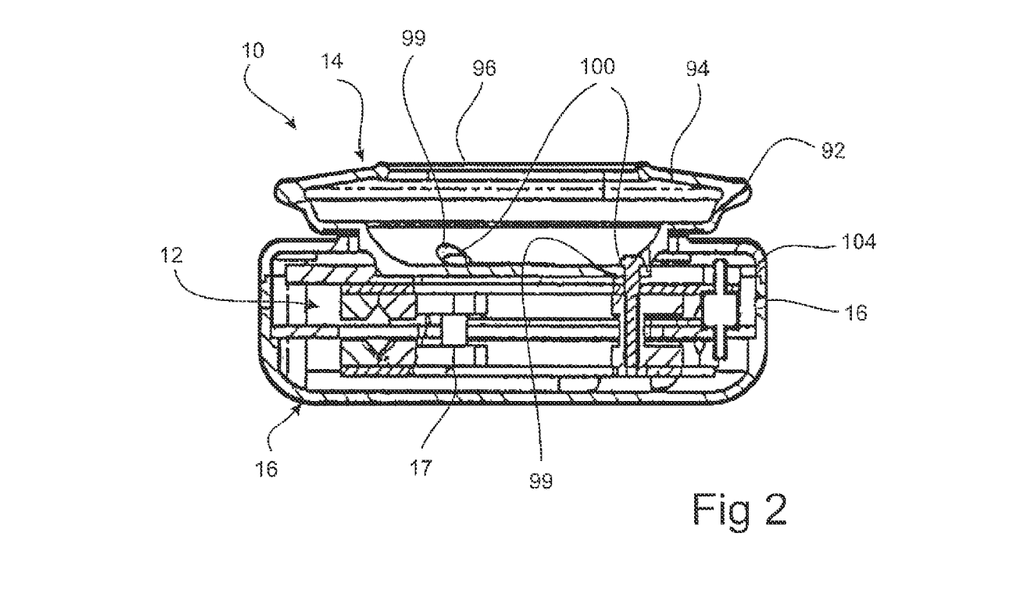
FIG. 2 is a section view of the tool shown in FIG. 1.

Referring to FIGS. 1 to 3, the handle 14 is in the general form of a saucer 92 with a annular lip 94 extending radially inward from an upper 93 edge of the saucer 92. The lip 94 has an inner circumferential edge 96 defining an opening 98. Three equally spaced-apart holes 99 are formed in the saucer portion 92 and are accessible through the opening 98. Respective screws 100 are received in the holes 99. A channel 102 extends through the saucer portion 92 to form a conduit for receiving a cable providing power and signaling to the motor 12.

An annular cap 104 is disposed between the handle 14 and the contact member 16. The cap 104 has a central aperture 106 that has a greater diameter than an outer diameter, the lower part of the saucer portion 92 extending through the aperture 106. The cap 104 is also provided with three equally spaced-apart holes 108 for receiving respective screws 110.

As seen in FIG. 3, the contact member 16 comprises an upright circumferential wall 114 extending about the planar contact surface portion 17. This in effect forms a receptacle for receiving the motor 12. In additional to the posts 40, the contact member 16 also comprises a plurality of upright posts 116 that extend only up to the ledge 44. Each of the posts 116 is provided with a central axially extending hole 118.

The combination of the contact member 16, cap 104 and handle 14 form a housing or casing 119 for the tool 10.

With particular reference to FIGS. 3 and 4, the tool 10 is assembled as follows. Once the motor 12 has been assembled as described above, the motor 12 is placed in the contact member 14 by keying the U-shaped cutouts 38 with the posts 40. As a consequence of this, the holes 118 in the posts 116 are in alignment with the holes 48 on the carrier 22. The carrier 22 can be firmly anchored to the contact member 16 by screws (not shown) passing through the holes 48 and screwing into the holes 118.

The cap 104 is then placed over the motor and screwed to the contact member 16 by the screws 110 that pass through the holes 108 and into the holes 43 formed in the posts 40.

Next, the handle 14 is placed on top of the cap 104 with the saucer 92 extending into the aperture 104. The holes 99 are aligned with the holes 64 in the first magnet plate 52 which in turn are aligned with the holes 74 in the spacers 68. The screws 100 are then screwed into underlying aligned holes 74. Accordingly, the stator 23/magnet 24 is firmly attached to the handle 14.

By virtue of the resilient coupling 18, the armature 19 can move in a plane relative to the stator 23, and consequently the handle 14 can move in a parallel plane relative to the contact member 16.

Figure 6:
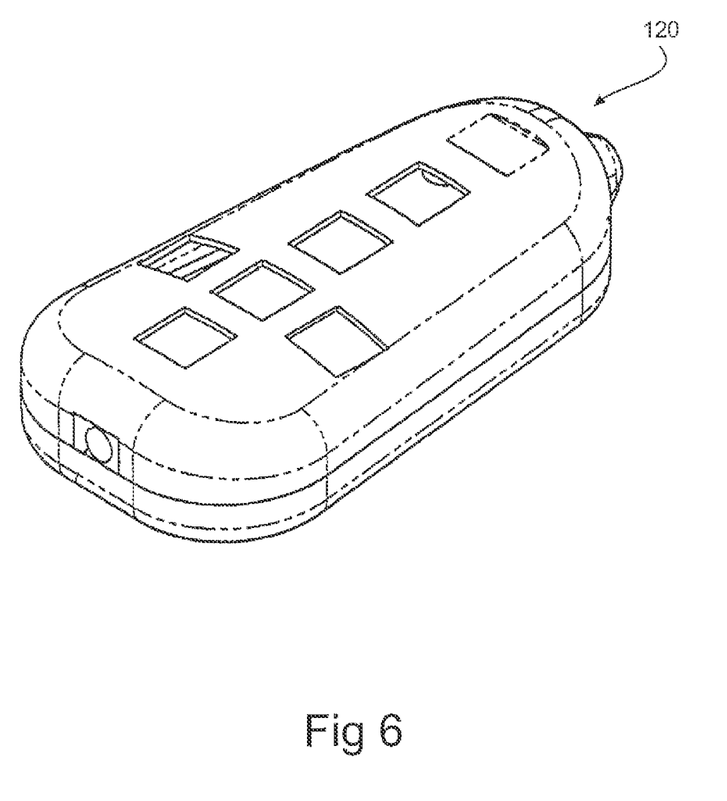
FIG. 6 is a perspective view of a hand held controller for the tool.

When the tool 10 is used for massage, a therapist such as a physiotherapist holds the handle 14 with their fingers disposed about the upper edge 93 of the handle 14. When power is supplied to the motor 12, the forces F cause planar motion of the carrier 22, and thus the contact member 16 relative to the handle 14. As described above, a path of this planar motion can be controlled by appropriate phasing of the currents supplied to the coils 20. By manipulating buttons or controls on the hand-held controller 120 depicted in FIG. 6, characteristics of the current supplied to the coils 20 can be varied to enable variation in the frequency, amplitude and pattern of motion of the contact member 16 relative to the handle 14. When the contact surface 17 of the contact member 16 is applied to the skin or body part of a person, the motion of the contact member 16 is transferred by friction or contact to the patient.

Figure 7A:
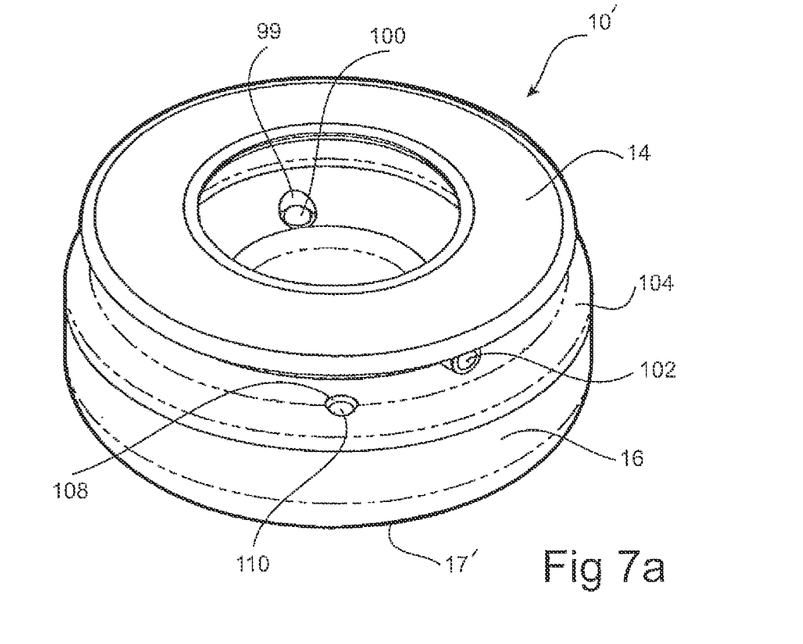
FIG. 7A is a perspective view of a second embodiment of the tool looking diagonally toward a top of a handle of the tool.
Figure 7B:
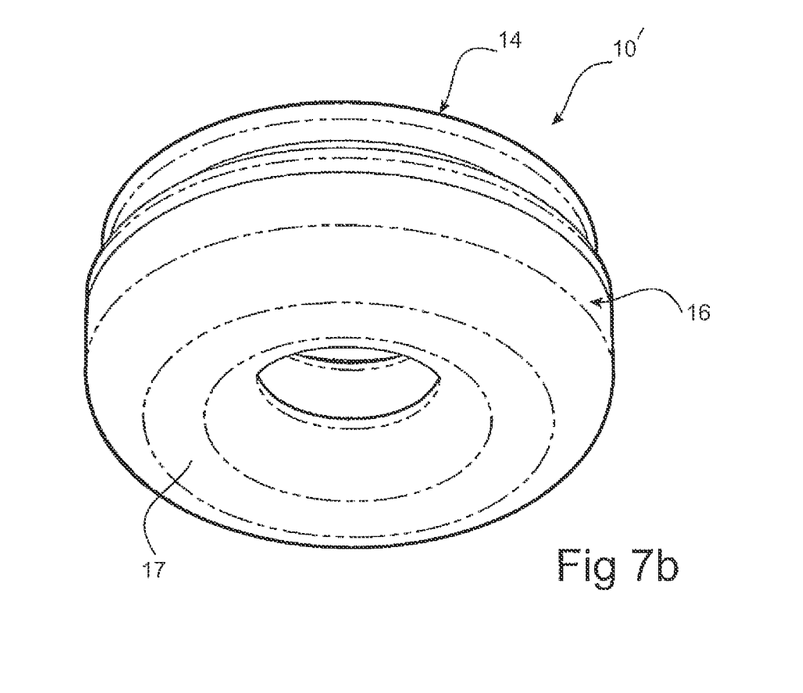
FIG. 7B is a perspective view of the tool shown in FIG. 7A looking toward the bottom of the tool.
Figure 7C:
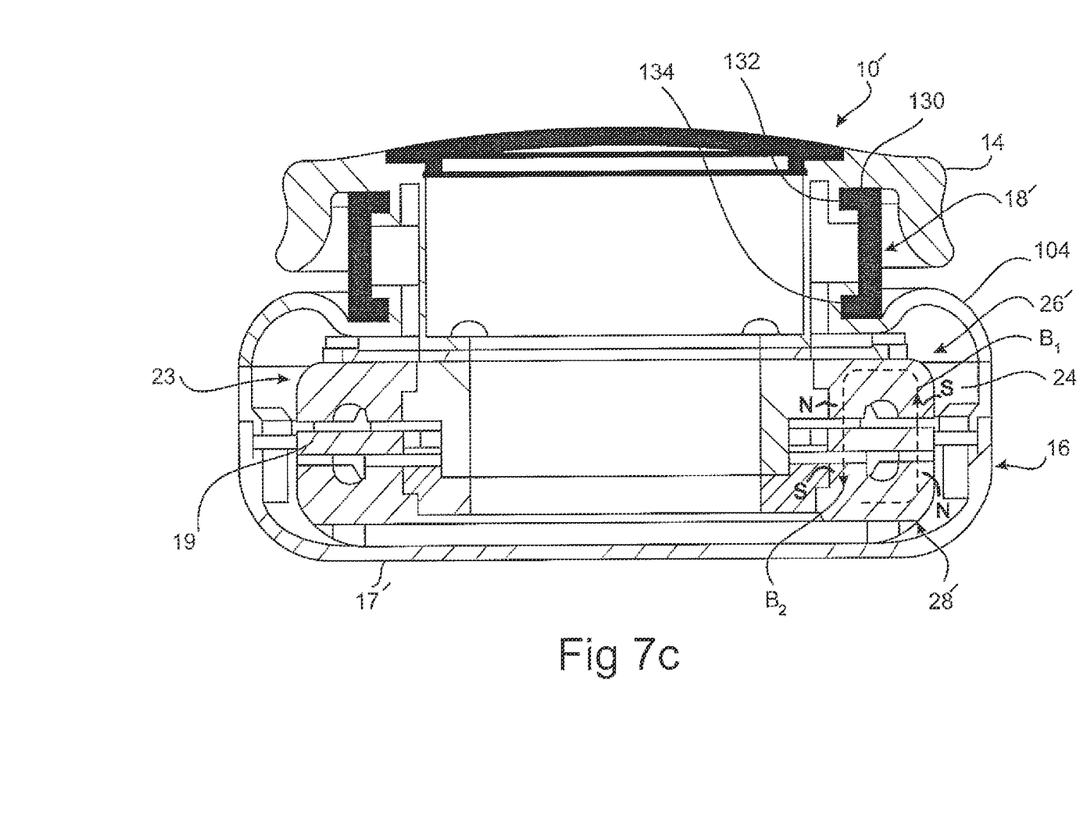
FIG. 7C is a partial section view of the tool shown in FIGS. 7A and 7B.

FIGS. 7A to 7C depict a further embodiment of the tool 10'. This embodiment differs from the tool 10 in the following ways.

The magnet 24 of the tool 10' comprises a first ring or annulus-shaped pole piece 26' on one side of the coils and a second single ring or annulus-shaped pole piece 28' on the opposite side of the coils. Each ring-shaped pole piece has a central groove facing the coils providing separation between North and South poles of each pole piece. The ring-shaped pole pieces 26' and 28' have their poles arranged so that opposite poles are axially opposed to thereby provide a closed flux path that includes lines of magnetic flux B1 and B2 travelling in opposite directions, but both perpendicular to a direction of current flow through the coils. As a consequence of the change in configuration of the magnet 24', the coils are radiused to have lengths that lie between the ring-shaped pole pieces 26' and 28'.

A further variation in the tool 10' is the configuration of the resilient coupling 18'. Here, the resilient coupling 18' is in the form of an endless band having spaced-apart beads 130 that seat within a circular recess 132 formed in the handle 14 and a circular recess 134 formed in the cap 104. The coupling 18' may include a plurality of spaced apart incompressible posts imbedded in a resilient material in order to limit the degree of axial motion of the handle 14 relative to the contact portion 16. The resilient coupling 18 allows motion in a plane of the handle 14 relative to the coupling member 16 in an identical manner to the resilient members 18A to 18C of the tool 10. Also in this embodiment the carrier 22 remains fixed to the contact member 16 and the magnet 24' is attached to the handle 14.

By virtue of this configuration, the tool 10' may be formed with a central aperture 136 or a plurality of apertures as shown most clearly in FIGS. 7B and 7A. This enables various additional uses of the massaging tool 10'. For example, it allows the tool 10' to accept a body part or parts for stimulation or massage. In this regard, an inflatable member or packer can be provided about the inside surface of the central hole to provide cushioning support to sensitive areas.

Figure 8:
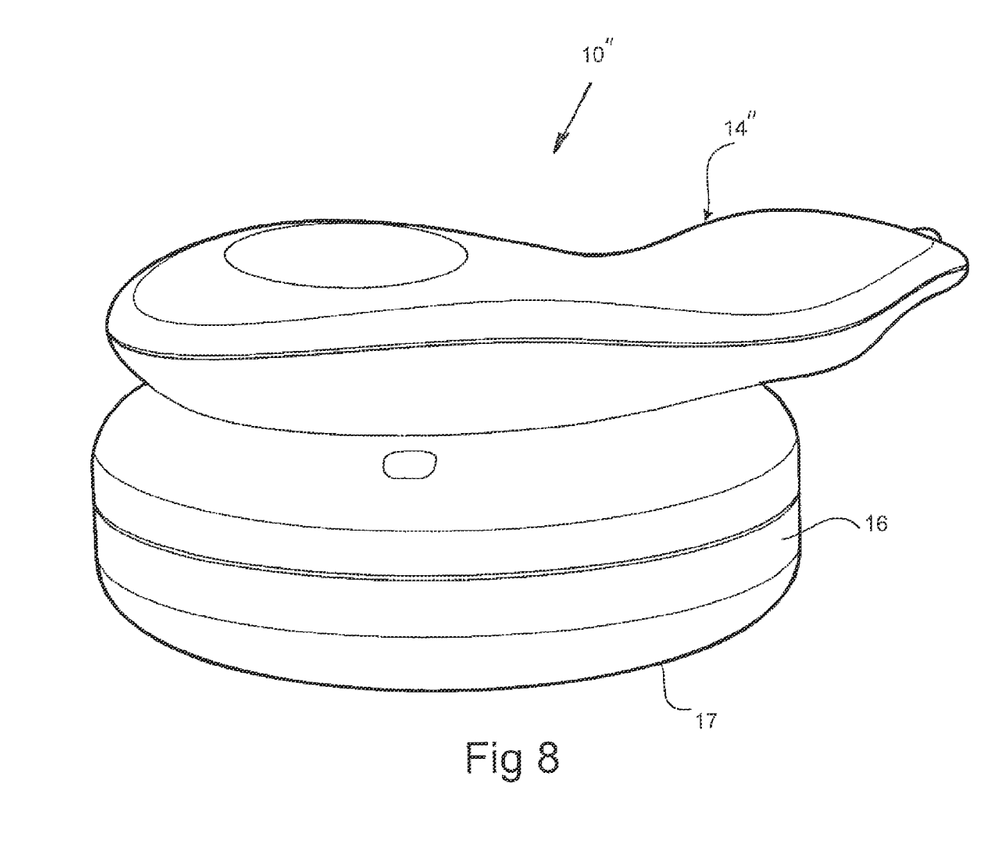
FIG. 8 is a perspective view of the third embodiment of the tool.
Figure 9:
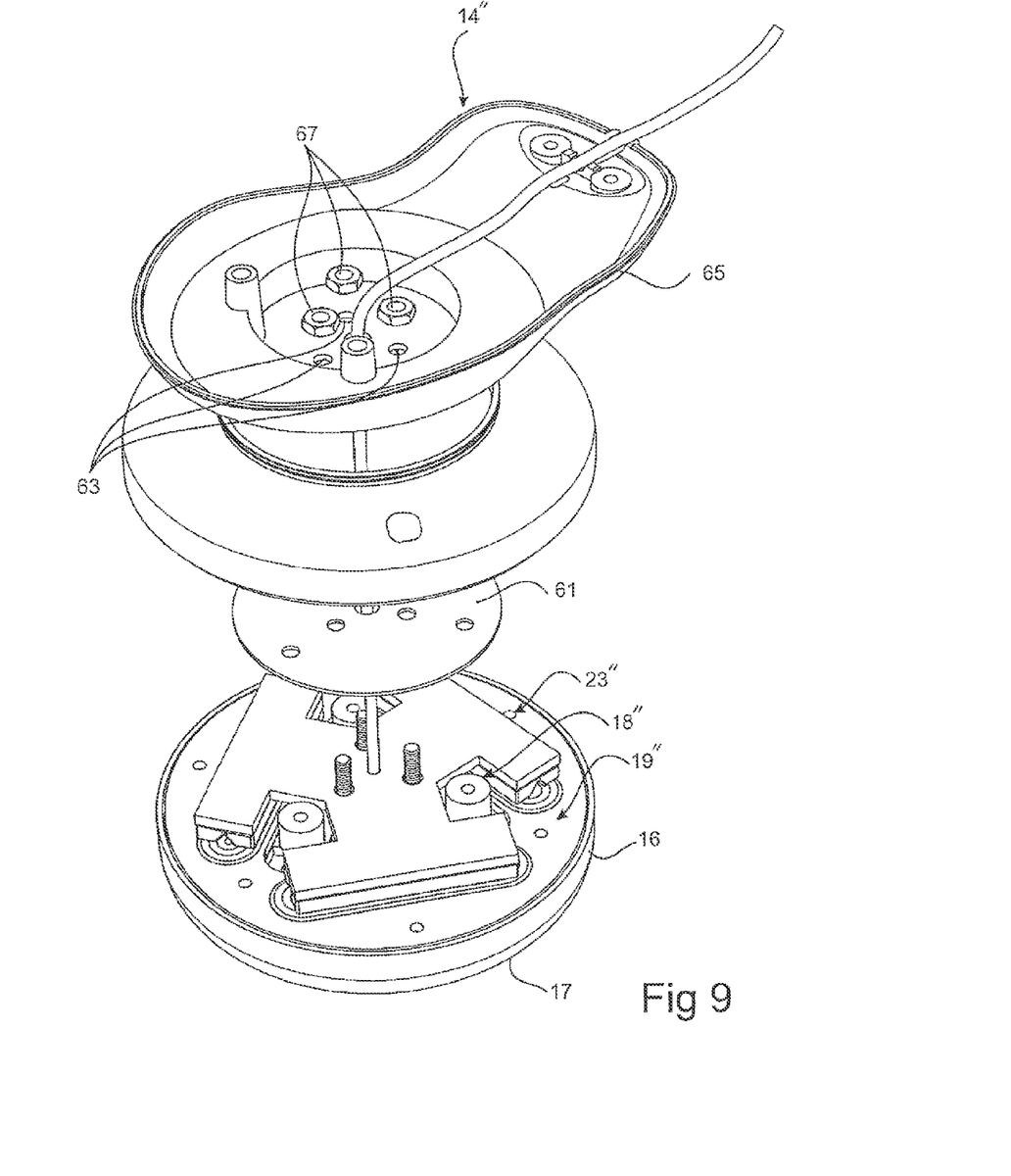
FIG. 9 is a partially exploded view of the tool shown in FIG. 8.
Figure 10:
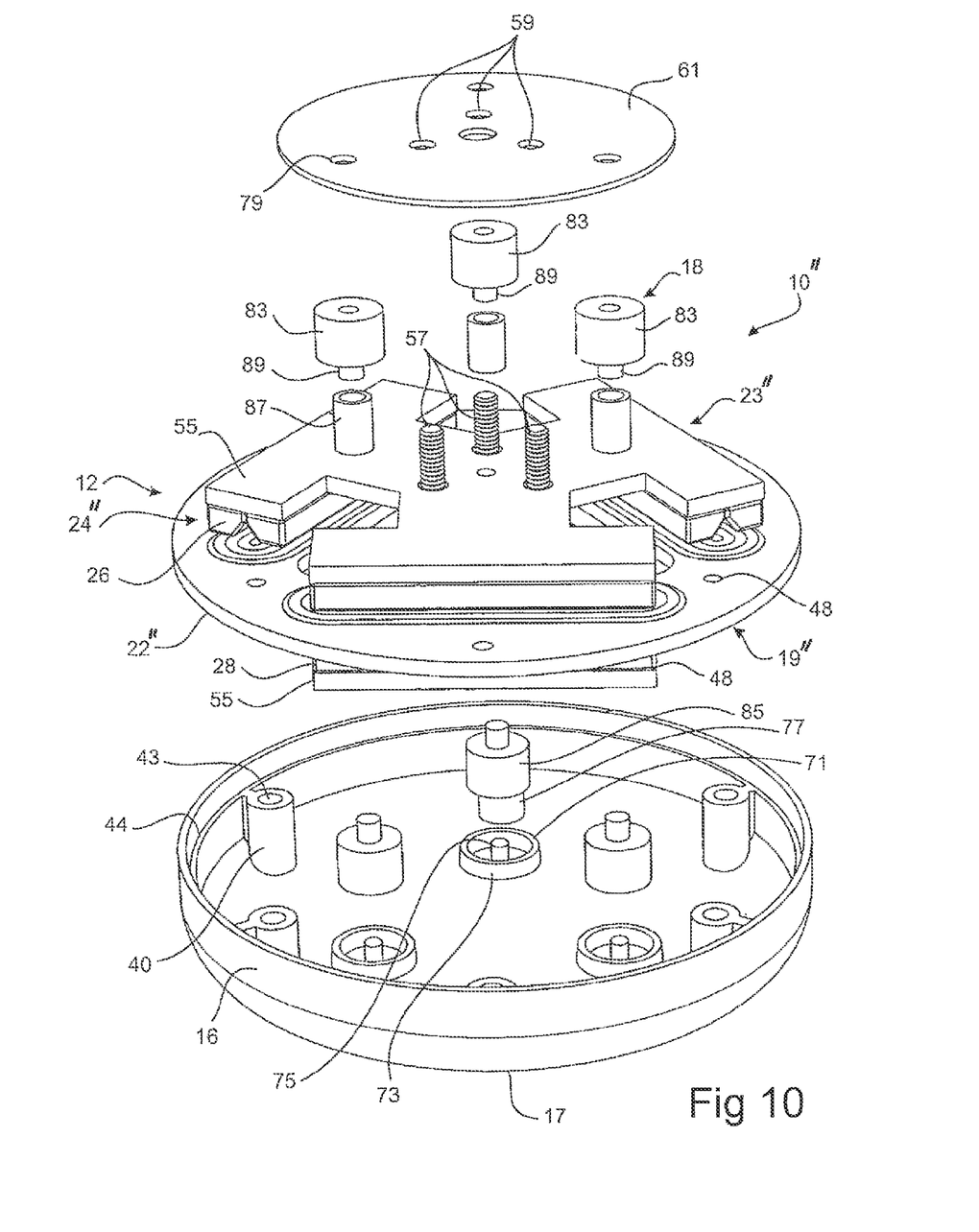
FIG. 10 is a exploded view of the tool.

FIGS. 8 to 10 depict a further embodiment of the tool 10". The tool 10" operates in substantially the same manner as, and includes in essence, the same salient features of the tool 10.

The main differences between the tool 10 and the tool 10" can be summarised as follows. Firstly, the handle 14" in the tool 10" is ergonomically shaped to allow more comfortable gripping by the hand of a user of the tool 10". The electric motor 12" of the tool 10" differs only marginally from the motor 12 in that the backing plates 52 and 54, which are of different configuration to each other in the tool 10, are now replaced with plates 55, each having the general shape of three T-sections joined together at 120° to each other in the tool 10". The carrier 22" of armature 19" is also of slightly simpler configuration than the carrier 22 in that it does not include the cutouts 38 nor the counter-sunk holes 46. Rather, the carrier 22" is provided with a number of holes 48 that register with threaded holes 43 formed axially in the posts 40 moulded to the contact member 16. The magnet 24" of the motor 12" is identical to that of the tool 10.

In the tool 10", three studs 57 are used to couple the backing plates 55 together and thus space the poles 26 and 28 a fixed distance apart, creating a gap within which the armature 19"/carrier 22" sits. The studs 57 pass through holes 59 formed in an overlying disc 61. As shown most clearly in FIG. 9, the studs 57 also pass through holes 63 formed in a lower shell 65 of the handle 14". Nuts 67 are screwed onto the protruding parts of the studs 57 to effectively bolt the handle 14" to the stator 23"/magnet 24".

The resilient coupling 18 of the tool 10 shown in FIGS. 1 to 4 is now replaced by resilient coupling 18" comprising three spring assemblies, each of which comprises upper and lower cylindrical portions 83 and 85, respectively, with an intermediate sleeve 87. Each portion 83 and 85 includes an axial stub 89 that fit into opposite ends of the sleeve 87 so that each spring assembly has a configuration similar to a dumbbell. The cylindrical portions 83 and 85 are made from rubber or other elastomeric material, while the sleeve 87 may be made from hard plastics or metal. The lower portions 85 are seated in corresponding seats 71 formed on an inside surface of the contact member 16. The seats 71 comprise an outer circumferential wall 73 and a central upwardly extending spigot 75. The lower portion 85 includes a depending boss 77 having a central axial hole (not shown) so that the boss 77 fits within the wall 73 and the spigot 75 enters the hole in the boss 77.

Each upper portion 83 is coupled by a mechanical fastener (not shown) extending through corresponding holes 79 formed in the plate 61.

In the tool 10", the handle 10" is rigidly and directly coupled to the stator 23" and thus magnets 24, while the armature 19" is fixed to the contact member 16. The resilient couplings 18" resiliently couple the armature 19" to the contact member 16 and thus to the armature 19", thereby enabling movement of the armature 19" relative to the stator 23" in a plane containing the armature 19".

Now that embodiments of the present invention have been described in detail, it will be apparent to those skilled in the relevant arts that numerous modifications and variations may be made without departing from the basic inventive concepts.

For example, all of the electric circuits required to control the tool may be placed on the printed circuit board 84 with control buttons integrated in the handle 14. Also in the present embodiments, three spaced-apart coils 20A, 20B and 20C are used. Each coil is provided with a different phased current. However, in alternative variations additional coils may be used. In addition, the shape of the handle 14 and contact member 16 may be varied from the disc or donut-like shapes depicted in the accompanying drawings. The shape of these components is simply a matter of design.

In addition, pads or other attachments may be attached to the contact member 16 to produce various effects. For example, pads made from textured material that may provide for example a cleaning or scrubbing effect may be applied to the contact surface 112 as may, for example, pads with knobs, bumps or projections extending therefrom. In addition, resilient and/or pliable pads may be attached to the contact member 16. In a further variation particularly suitable for the tool 10', a funnel-like member made of a resilient material may be attached to or simply supported by the central hole through tool 10 to assist lactating women in expressing milk. A mouth of the funnel may be placed on the breast with a tail portion of the funnel leading into a bottle.

Also, such modifications and variations are deemed to be within the scope of the present invention, the nature of which is to be determined from the above description.

What is claimed is:

1. A hand held massager comprising
a housing having an opening and a contact member provided with a contact surface portion lying in a first plane wherein the contact surface is configured to massage a portion of a human body;
a handle enabling manual gripping of the tool;
an electric motor located inside the housing, the electric motor having: a stator and an armature which, upon an electric current flowing through the armature, together produce a plurality of transverse linear forces facilitating a non-rotary translational motion of the armature in a second plane relative to the stator, the stator having: on each of opposite sides of the armature, magnets and a backing plate to which the magnets are attached; and, one or more spacing members that extend perpendicular to the armature and space the magnets from the opposite sides of the armature thereby creating a gap within which the armature moves;
wherein the handle is attached to one of the stator and the armature through the opening in the housing, and the contact member is attached to another of the stator and the armature, and wherein the first plane is parallel to the second plane, whereby the relative motion between the armature and the stator produces corresponding motion of the contact member relative to the handle; and
a resilient coupling coupled between the handle and the contact member and applying a bias against the motion of the contact member relative to the handle.

2. The massager according to claim 1 wherein the armature comprises a carrier that is formed separately of the contact member and attached to or otherwise coupled with the contact member.

3. The massager according to claim 1 wherein the handle is rigidly attached to the stator.

4. The massager according to claim 3 wherein the contact member is attached to the armature.

5. The massager according to claim 1 wherein the resilient coupling comprises one or more resilient members interposed between the stator and the armature.

6. The massager according to claim 5 wherein the resilient members comprise resilient posts.

7. The massager according to claim 1 wherein the resilient coupling comprises one or more resilient members connected between the handle and the contact member.

8. The massager according to claim 1 wherein the magnets comprise a first set of north and south poles on one side of the armature and a second set of north and south poles on an opposite side of the armature, wherein the poles in the first set are axially aligned with magnetically opposite poles in the second set, and the first set of poles is attached or adhered to a first of the backing plates and the second set of poles is attached or adhered to a second of the backing plates, the backing plates being made of a magnetically permeable material.

9. The massager according to claim 1 wherein the handle is a component of the housing and is disposed on a side of the electric motor opposite the contact surface.

10. The massager according to claim 1 further comprising a circuit board carrying electronic circuits to control the tool.

11. The massager according to claim 10 wherein the electronic circuits are operable to produce dynamic changes in amplitude of motion of the contact member relative to the handle while maintaining constant frequency of motion.

* * * * *